United States Patent [19]

Yada et al.

[11] Patent Number: 4,604,411
[45] Date of Patent: Aug. 5, 1986

[54] PROCESS FOR PREPARING STICKY POLYMERS

[75] Inventors: Akira Yada, Kusatsu; Shusaku Matsumoto, Kyoto; Yoshihiro Kawamori, Joyo; Takao Saito, Nagaokakyo; Tadashi Nishiyama; Yoshitugu Adachi, both of Kyoto, all of Japan

[73] Assignee: Dai-Ichi Kogyo Seiyaku Co., Ltd., Kyoto, Japan

[21] Appl. No.: 689,004

[22] Filed: Jan. 4, 1985

[30] Foreign Application Priority Data

Jan. 13, 1984 [JP] Japan ................................. 59-5235
Jan. 19, 1984 [JP] Japan ................................. 59-8085

[51] Int. Cl.$^4$ ............................ C08F 2/46; C08F 2/48; C08F 2/10
[52] U.S. Cl. ..................................... 522/14; 264/22; 264/338; 524/714; 524/733; 524/745; 522/18; 522/84; 522/82; 522/72; 522/173; 522/175; 522/180; 522/182; 522/183; 526/62; 526/200; 526/217; 526/287; 526/303.1; 526/319; 526/310; 526/329.7; 526/341; 526/342; 526/920; 528/486
[58] Field of Search ..................... 204/159.22, 159.23; 526/62, 920, 250, 303.1, 307.2, 329.7, 310, 341–342, 286, 287, 319, 200, 217; 524/714, 733, 745; 428/422; 427/239; 522/14, 18, 84, 72, 85, 173, 180, 182–183

[56] References Cited

U.S. PATENT DOCUMENTS

| 2,468,664 | 4/1949 | Hanford et al. ................. 526/62 X |
| 3,951,600 | 4/1976 | Asano et al. ..................... 526/62 X |
| 4,005,157 | 1/1977 | Mattiussi et al. ............... 428/422 X |
| 4,331,787 | 5/1982 | Fairchok et al. ................ 526/62 X |

FOREIGN PATENT DOCUMENTS 198710 12/1982 Japan ..................................... 526/62

OTHER PUBLICATIONS

Schlanger et al., Modern Plastics Encyclopedia (Agranoff, J. (ed.)), McGraw-Hill, N.Y., p. 31 (1980).

*Primary Examiner*—Joseph L. Schofer
*Assistant Examiner*—F. M. Teskin
*Attorney, Agent, or Firm*—Antonelli, Terry & Wands

[57] ABSTRACT

An improved process for preparing a sticky water-soluble polymer, e.g. acrylamide polymers and acrylic acid polymers, which comprises polymerizing an aqueous solution of a monomer in a polymerization vessel of which the surface contacting the aqueous monomer solution is covered with a tetrafluoroethylene-ethylene copolymer film, whereby the stickiness of the produced polymer to the vessel is remarkably decreased, namely the peelability of the polymer from the vessel is remarkably improved, and moreover the polymerization conversion is remarkably improved. Also, the use of a metal deposited tetrafluoroethylene-ethylene copolymer film as a covering material improves the efficiency of a photopolymerization and enables to use a polymerization vessel made of an inexpensive material.

15 Claims, No Drawings

PROCESS FOR PREPARING STICKY POLYMERS

BACKGROUND OF THE INVENTION

The present invention relates to a process for preparing water-soluble polymers having a stickiness, and more particularly to a process for preparing sticky polymers in a good efficiency with a remarkably decreased adhesion to a polymerization apparatus.

Various water-soluble polymers have been produced from vinyl group-containing monomers e.g. acrylamide or methacrylamide: acrylic or methacrylic acid salts: nitrogen-containing acrylic acid esters such as quaternary salts or salts with acids of N,N-dialkylaminoalkyl acrlyates or methacrylates and quaternary salts or salts with acids of N,N-dialkylaminohydroxyalkyl acrylates or methacrylates: diallylamine compounds such as salts with acids of diallylamine and diallyldialkylammonium salts; sulfoalkyl acrylates or methacrylates: water-insoluble acrylic or methacrylic acid esters such as methyl acrylate or methacrylate, ethyl acrylate or methacrylate, butyl acrylate or methacrylate, hydroxyethyl acrylate or methacrylate and hydroxypropyl acrylate or methacrylate; acrylamide or methacrylamide derivatives such as acrylamide alkylsulfonates and dialkyl acrylamides or methacrylamides; acrylonitrile; and vinylsulfonic acid or its salts. In general, these polymers having a high degree of polymerization are obtained in the form of a relatively hard gel, but sticking or adhesion to the wall of a polymerization vessel, stirrer, etc. is noticeable and the separation of the polymers from the wall is not easy. Even polymers having a low degree of polymerization tightly adhere to the vessel wall. In practice, the polymers which have once adhered to the vessel wall are very difficult to remove.

In order to eliminate such a problem encountered by the production of water-soluble polymers having a high stickiness or adhesion property, various processes are proposed, e.g. a process wherein removal of the polymers is improved by coating a releasing agent onto the wall surface of a polymerization vessel (as disclosed in Japanese Unexamined Patent Publication No. 41386/1978), a process wherein stainless steel treated, for instance, by electrochemical polishing is used as a vessel material in order to decrease the frictional resistance of the wall surface of a polymerization vessel (as disclosed in Japanese Unexamined Patent Publication No. 10387/1979), and a process wherein removal of the polymers is improved by coating a synthetic resin onto the wall surface of a polymerization vessel (as disclosed in Japanese Unexamined Patent Publication No. 73583/1981).

The above former two processes improve the peelability of the polymers from the wall surface to some extent, but are still insufficient when the stickiness or adhesion property of the produced water-soluble polymers is high.

Generally, coating of the wall surface of a polymerization vessel with synthetic resins is effective in improving the peelability of the sticky polymers from the wall surface. For this purpose, there have been used synthetic resins such as polyethylene, polypropylene, polyester, polyamide, polytetrafluoroethylene, polytrifluorochloroethylene, polyvinyl chloride and epoxy resin. It is known that polytetrafluoroethylene and polytrifluorochloroethylene are particularly useful for improving the peelability.

However, the use of the polymerization vessel coated with the synthetic resins as mentioned above in polymerization of an aqueous solution of the abovementioned vinyl monomers has the disadvantage that conversion of the monomers to the polymers is very low in the vicinity of the boundary between the synthetic resin coating and the produced water-soluble polymer gel, and in an extreme case, the monomers remain unreacted in the vicinity of the boundary, thus resulting in lowering of the polymerization conversion and the yield. Further, in case of toxic monomers such as acrylamide and powerful smelling monomers such as acrylic or methacrylic acid esters, remaining of the unreacted monomers may cause a problem in environmental pollution such as the toxicity for human body in work operation. It has been considered that the low conversion of monomers in the vicinity of the synthetic resin coating is caused by oxygen present on the coating surface. Accordingly, in case of using a polymerization vessel coated with a synthetic resin, it is necessary to select a coating material which does not exert a bad influence on the polymerization behavior.

It is known to be able to prepare the water-soluble polymers by photopolymerization of vinyl monomers with irradiation of ultraviolet rays. It is also known to conduct the photopolymerization by supplying an aqueous solution of the monomers in the form of a thin layer. In that case, the polymerization efficiency is raised by using a polymerization vessel having a surface of a high reflectivity to ultraviolet rays, e.g. a vessel made of mirror finished stainless steel. However, the mirror finished stainless steel is expensive and the use thereof requires a large equipment investment when practicing the photopolymerization on an industrial scale. Further, in case that the produced polymer is sticky, it is not easy to remove the polymer from the surface of the polymerization vessel even if the vessel is made of a mirror finished stainless steel. Since the polymerization of a monomer in the form of a thin layer by irradiation of ultraviolet rays is completed in a very short period of time, it is industrially very important that the sheet of the produced polymer can be easily peeled off from a substrate for supporting the monomer layer.

It is an object of the present invention to provide a process for preparing a water-soluble polymer having a high stickiness or adhesion property in an improved yield without difficulty in recovering the polymer from a polymerization vessel.

A further object of the present invention is to provide a process for preparing a sticky water-soluble polymer by photopolymerization, according to which the polymer can be obtained in a high yield employing an inexpensive polymerization vessel and can be easily recovered from the polymerization system.

These and other objects of the present invention will become apparent from the description hereinafter.

SUMMARY OF THE INVENTION

The present inventors have found that the tetrafluoroethylene-ethylene copolymer exhibits an excellent peeling effect without exerting a bad influence on the polymerization and can eliminate the abovementioned drawbacks of the prior art.

In accordance with the present invention, there is provided an improvement in a process for preparing a sticky water-soluble polymer by polymerizing an aqueous solution containing a monomer having a polymerizable double bond, the improvement which comprises carrying out the polymerization in a polymerization apparatus the portion of which contacts the monomer solution has a surface made of a tetrafluoroethylene-ethylene copolymer.

The tetrafluoroethylene-ethylene copolymer (hereinafter referred to as "TFE-ethylene copolymer") is one of fluorine-containing synthetic resins, but the physical properties of the film thereof are entirely different from those of other fluorine-containing resins such as polytetrafluoroethylene and polytrifluorochloroethylene.

It has not been known or reported to use the TFE-ethylene copolymer as a covering material of a contacting surface of a polymerization apparatus, and also there is no literature suggesting that the TFE-ethylene copolymer covering is excellent in polymerization characteristics as compared with a generally used polytetrafluoroethylene covering.

The TFE-ethylene copolymer is superior to polytetrafluoroethylene and polytrifluorochloroethylene in the following points.

(1) The copolymer has an excellent moldability. It can be formed into a film, and also the heat sealing and the lamination with a rubber or a metal are easy. Accordingly, application thereof to a polymerization vessel is easier than polytetrafluoroethylene and polytrifluorochloroethylene.

(2) The copolymer has excellent mechanical properties, especially tensile strength. Accordingly, it is applicable as a covering material to various reactors.

(3) The film of the copolymer has a lower gas permeability than the films of polytetrafluoroethylene and polytrifluorochloroethylene, and accordingly is excellent in oxygen impermeability. Further, since the affinity to oxygen on the film surface is small, it is possible to completely eliminate the hindrance to polymerization on the film surface which is the serious drawback of a covering of polytetrafluoroethylene or polytrifluorochloroethylene. Such an effect is obtained only by the present invention and is an important feature of the present invention.

(4) The copolymer has an excellent weatherability, and deterioration due to ultraviolet rays is scarcely observed. Also, the transmission of ultraviolet rays having a wavelength of 300 to 400 mµ required in photopolymerization by ultraviolet ray irradiation is higher than that of polytetrafluoroethylene or polytrifluorochloroethylene. Accordingly, the copolymer is very suitable as a covering material of a vessel for ultraviolet ray polymerization.

DETAILED DESCRIPTION

In the present invention, at least a portion of a polymerization vessel which contacts a monomer is covered with a TFE-ethylene copolymer film. The covering can be made in usual manners, e.g. affixing of the film onto the polymerization vessel with an adhesive, and coating. The polymerization vessel which may have any shapes such as square and cylinder, can be covered with the copolymer film easily. The thickness of the copolymer film is usually from 10 to 100 µm., preferably 25 to 75 µm. It is also possible to use a bag made of the TFE-ethylene copolymer in the polymerization.

The process of the present invention is applicable to the production of any known water-soluble polymers, for instance, water-soluble homopolymers and copolymers obtained from monomers having a polymerizable double bond, e.g. acrylamide or methacrylamide; acrylic or methacrylic acid salts; nitrogen-containing acrylic acid esters such as quaternary salts or salts with acids of N,N-dialkylaminoalkyl acrylates or methacrylates and quaternary salts or salts with acids of N,N-dialkylaminohydroxyalkyl acrylates or methacrylates; diallylamine compounds such as salts with acids of diallylamine and diallylalkylammonium salts; sulfoalkyl acrylates or methacrylates; water-insoluble acrylic or methacrylic acid esters such as methyl acrylate or methacrylate, ethyl acrylate or methacrylate, butyl acrylate or methacrylate, hydroxyethyl acrylate or methacrylate and hydroxypropyl acrylate or methacrylate; acrylamide or methacrylamide derivatives such as acrylamide alkylsulfonates and dialkyl acrylamides or methacrylamides; acrylonitrile; and vinylsulfonic acid or its salts.

In general, these water-soluble polymers are prepared by polymerizing an aqueous solution of monomers. The concentration of the monomers in the aqueous solution varies depending on the kind of the monomers, the polymerization manner, and the like. For instance, in case of acrylamide polymers, namely homopolymer of acrylamide and copolymers of acrylamide and other polymerizable vinyl monomers such as acrylamide derivatives, acrylic or methacrylic acid, alkyl acrylates or methacrylates, hydroxyalkyl acrylates or methacrylates, acrylonitrile, styrene and vinyl acetate, the concentration of the monomer is from 20 to 60% by weight, preferably 30 to 45% by weight. The aqueous solution is preferably adjusted to pH 8 to 12. In case of water-soluble cationic polymers, e.g. homopolymer of a quaternary salt or salt with an acid of a dialkylaminoalkyl acrylate or methacrylate and copolymers thereof with other polymerizable vinyl monomers, the concentration of the monomer is from 50 to 80% by weight, preferably 60 to 75% by weight. The aqueous solution is preferably adjusted to pH 4 to 7. Any of known polymerization initiators can be used in the polymerization, e.g. thermally activatable initiators such as persulfates, azo initiators and peroxides, redox initiators such as a combination of a persulfate and potassium sulfite and a combination of a persulfate and an amine compound, and photoactivatable initiators such as benzoin, a benzoin alkyl ether and a benzoquinone compound.

In case of the photopolymerization by irradiation of light rays such as ultraviolet rays or γ-rays, it is possible to conduct a continuous polymerization by continuously supplying an aqueous solution containing a monomer and a photoinitiator onto a moving support having a surface made of the TFE-ethylene copolymer, e.g. an endless belt, in the form of a thin layer, irradiating light rays to the thin layer of the solution to polymerize the monomer, and continuously peeling off the produced polymer layer.

The present inventors have also found that when the contacting surface of a polymerization vessel with a monomer solution is covered with a film of a fluorine-containing resin, the back surface of which is provided with a metal deposited layer, so that the metal layer comes in contact with the polymerization vessel, the photopolymerization efficiency equals or is higher than that obtained by the use of a polymerization vessel made of a mirror finished stainless steel having a fluorine-containing resin coated surface is obtained with a remarkably reduced adhesion of the produced polymer to the vessel by employing a usual polymerization reactor. In that case, although various fluorine-containing resins may be used as a covering material, the TFE-ethylene copolymer is preferably used for the above-mentioned reason. According to the present invention, water-soluble polymers can be prepared in a high yield because the irradiated light rays are effectively utilized, and moreover continuous production of sticky polymers is possible because continuous peeling off of the polymers is easy. Moreover, it is possible to use a usual polymerization vessel made of materials which remarkably hinder the photopolymerization, e.g. stainless steel having no mirror finished surface, rolled steel for general stracture, colored or opaque polymer materials, rubbers, and ceramics.

The metal layer deposited on the TFE-ethylene copolymer can be formed in a usual manner, for instance, by metal vapor deposition such as vacuum deposition. The metal includes, for instance, aluminum, chromium, nickel, and a mixture thereof.

The photopolymerization is carried out by subjecting an aqueous solution of a monomer to irradiation of light rays, e.g. ultraviolet rays having a wavelength of 300 to 500 m$\mu$, especially 300 to 450 m$\mu$, more especially 350 to 400 m$\mu$ with an intensity of 2 to 100 W/m$^2$, especially 2 to 50 W/m$^2$, more especially 10 to 20 W/m$^2$. The irradiation of light may be conducted in multistages. In that case, the intensity of light may be 0 W/m$^2$ in a certain stage. The concentration of the monomer in the aqueous monomer solution is about 15 to about 80% by weight, preferably about 30 to about 70% by weight. The amount of the photoinitiator is usually from about 0.001 to about 0.5% by weight based on the monomer. When the amount of the photoinitiator is less than about 0.001% by weight or the concentration of the monomer is less than about 15% by weight, the polymerization is not sufficiently conducted. On the other hand, when the amount of the photoinitiator or the concentration of the monomer is more than each of the above ranges, the degree of polymerization is lowered in excess. Upon the photopolymerization, oxygen present in the polymerization system is removed by replacing the air in the system with an inert gas such as nitrogen, and the aqueous monomer solution from which oxygen is removed is supplied to the polymerization system. It is preferable that the concentration of oxygen in the polymerization atmosphere is at most 0.5% by volume and the concentration of dissolved oxygen in the aqueous monomer solution is at most 0.5 p.p.m. The relative humidity in the polymerization system is usually from 50 to 100%. The polymerization is carried out in an inert atmosphere usually for about 10 to about 60 minutes, especially 10 to 30 minutes. When the polymerization time is less than the above range, the polymerization does not sufficiently proceeds. In case of supplying an aqueous solution of a monomer in the form of a thin layer, the thickness of the layer is from about 3 to about 30 mm, especially about 5 to about 15 mm. When the layer of the solution is too thin, it is uneconomical, and when the layer is too thick, it is difficult to satisfactory remove the heat of reaction generated during the polymerization, and the desired water-soluble polymers are not obtained due to crosslinking which may occurs simultaneously with the polymerization. Preferably, the thickness of the solution layer is at most 10 mm.

The crosslinking of polymers may occur during the polymerization, particularly in photopolymerization. The crosslinking must be avoided, because the produced polymer or a portion of the produced polymer is rendered insoluble in water when the crosslinking occurs. For this purpose, it is effective to add a combination of (a) an anionic surfactant having —SO$_3^-$ group and/or a non-ionic surfactant and (b) an aliphatic tertiary amine to an aqueous solution of monomers prior to starting the polymerization, whereby the crosslinking is prevented and a high molecular weight polymer is produced. The use of such an additive is particularly effective for the production of acrylamide or methacrylamide polymers and acrylic or methacrylic acid polymers by photopolymerization. The surfactant is employed in an amount of 0.01 to 10% by weight based on the monomer. The aliphatic tertiary amine is employed in an amount of 0.001 to 5% by weight.

Examples of the anionic surfactant having —SO$_3^-$ group are, for instance, (1) an alkyl sulfate or its salt of the formula: $C_2H_{(2n+1)}OSO_3^-$ wherein n is an integer of 8 to 24, such as lauryl sulfate or stearyl sulfate, (2) an alkylarylsulfonate of the formula:

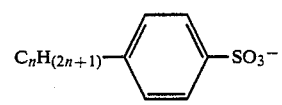

wherein n is an integer of 8 to 20, such as dodecylbenzenesulfonate or tetradecylbenzenesulfonate, (3) an alkylnaphthalenesulfonate formaldehyde condensate of the formula:

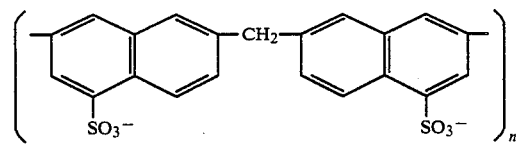

(4) a dialkyl sulfosuccinate of the formula:

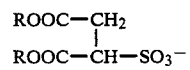

wherein R is an alkyl group having 4 to 20 carbon atoms, and (5) a polyoxyalkylene alkyl ether sulfate of the formula: $C_nH_{(2n+1)}C(CH_2CH_2O)_mCH_2CH_2OSO_3^-$ wherein n is an integer of 8 to 20 and m is 0 or an integer of 1 to 30. The anionic surfactants may be employed alone or in admixture thereof.

Examples of the non-ionic surfactant are, for instance, (1) a polyoxyethylene alkylphenyl ether of the formula:

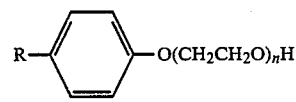

wherein R is a alkyl group having 3 to 20 carbon atoms and n is an integer of 8 to 100, such as polyoxyethylene nonylphenyl ether (n=12) or polyoxyethylene octylphenyl ether (n=15), (2) a polyoxyethylene alkyl ether of the formula: R—O—(CH$_2$CH$_2$O)$_n$H wherein R is an alkyl group having 8 to 24 carbon atoms and n is an integer of 8 to 100 carbon atoms, such as polyoxyethylene lauryl ether (n=15) or polyoxyethylene oleyl ether (n=12), (3) a polyethylene glycol fatty acid ester of the formula: R—COO(CH$_2$CH$_2$O)$_n$H wherein R is an alkyl group having 8 to 20 carbon atoms and n is an integer of 8 to 100, such as polyethylene glycol oleic acid ester (n=18), and (4) a polyoxyethylene sorbitan ester such as polyoxyethylene sorbitan monostearate (n=20). The non-ionic surfactants may be employed alone or in admixture thereof. It is desirable to use a non-ionic surfactant which is soluble in water at ordinary temperature.

Water-soluble tertiary amines of the formula: $N(R_1R_2R_3)$ wherein $R_1$, $R_2$ and $R_3$ are a lower alkyl group having 1 to 3 carbon atoms, a hydroxyalkyl group having 1 to 3 carbon atoms or polyoxyethylene, are employed as the aliphatic tertiary amine. Examples of the aliphatic tertiary amine are, for instance, trimethylamine, triethylamine, dimethylethylamine, methyldiethylamine, triethanolamine, methyldiethanolamine, dimethylethanolamine and ethyldiethanolamine.

The ratio of the surfactant (a) to the aliphatic tertiary amine (b) is important for attaining the above-mentioned purpose. The ratio of the tertiary amine to the surfactant is 0.01 to 10:1 by weight, preferably 0.1 to 1:1 by weight.

Also, in a polymerization of an aqueous solution of a monomer, the increase of the monomer concentration tends to cause crosslinking of the produced polymer unless the generated heat is efficiently removed. Even if the generated heat is efficiently removed, it is difficult to completely prevent the crosslinking when the monomer concentration is high, because the rate of polymerization becomes high. The crosslinking can be prevented by adding a water-soluble cellulose derivative to an aqueous solution of a monomer. The use of the water-soluble cellulose derivative also improves the peelability of the produced polymer. Examples of the water-soluble cellulose derivative usable for this purpose are, for instance, carboxymethyl cellulose, hydroxypropyl cellulose, hydroxyethyl cellulose, methyl cellulose and carboxymethyl hydroxypropyl cellulose. The water-soluble cellulose derivative is employed in an amount of 0.01 to 10% by weight, preferably 0.1 to 5% by weight, based on the monomer.

When it is desired to produce acrylamide polymers having a low molecular weight by photopolymerization, e.g. irradiation of ultraviolet rays to an aqueous solution of a monomer, it can be attained by adding a hypophosphite or a combination of a hypophosphite and a tertiary amine to an aqueous solution of a monomer. It is possible to control the molecular weight of the produced polymer by varying the amounts of the hypophosphite and the tertiary amine. The amount of the hypophosphite is selected from 0.001 to 1.0% by weight, preferably 0.01 to 0.5% by weight, based on the monomer. The amount of the tertiary amine is selected from 0.01 to 5.0% by weight, preferably 0.01 to 2.5% by weight, based on the monomer. Examples of the hypophosphite are, for instance, sodium hypophosphite, potassium hypophosphite, ammonium hypophosphite and tertiary amine salts of hypophosphorous acid. Examples of the tertiary amine are, for instance, trimethylamine, triethylamine, dimethylethylamine, methyldiethylamine, triethanolamine, methyldiethanolamine, dimethylethanolamine and ethyldiethanolamine.

In case of preparing water-soluble cationic polymers by photopolymerization, formation of the crosslinked water-insoluble polymers is prevented by adding a hypophosphite such as an alkali metal hypophosphite or ammonium hypophosphite to an aqueous solution of a monomer. In that case, the hypophosphite is employed in an amount of at least 1 p.p.m., preferably 10 to 500 p.p.m., based on the monomer.

The water-soluble polymers produced in the form of an aqueous gel by polymerizing an aqueous solution of a monomer is usually pulverized into particles and dried. Since the water-soluble polymers are sticky, the pulverized gel particles are easy to adhere to each other to form agglomerates and consequentially the drying efficiency is lowered. The polymerization of an aqueous monomer solution in the presence of a dialkyl sulfosuccinate is effective for preventing agglomeration of gel particles of acrylamide or methacrylamide polymers in pulverization and drying steps. Examples of the dialkyl sulfosuccinate are, for instance, sodium dibutyl sulfosuccinate, sodium di-2-ethylhexyl sulfosuccinate, sodium dinonyl sulfosuccinate, sodium butyl-2-ethylhexyl sulfosuccinate, sodium 2-ethylhexyllauryl sulfosuccinate, and the like. The dialkyl sulfosuccinates may be employed alone or in admixture thereof, and also may be employed in combination with a minor amount of other surfactants such as non-ionic surfactants and anionic surfactants. The amount of the dialkyl sulfosuccinate used for the above purpose is from 0.001 to 5%, preferably 0.05 to 0.5%, based on the solid matter of the aqueous polymer gel.

The water-soluble polymers, particularly polymers produced by photopolymerization, are easy to crosslink during the drying, thus are insolubilized in water. For preventing the insolubilization in water of photopolymerized acrylamide polymers and acrylic acid polymers caused by drying, it is effective to add an aminocarboxylic acid having hydroxyl group to the polymers prior to drying the polymers. The effect can be further improved by using the aminocarboxylic acid having OH group in combination with an aminocarboxylic acid having no OH group or a urea compound such as uraea, thiourea, ethyleneurea or guanidine salts, which is preferably employed in a minor amount. The aminocarboxylic acid having OH group or the above combination is employed in an amount of 0.01 to 10% by weight, preferably 0.1. to 5% by weight, based on the polymer. Examples of the aminocarboxylic acid are, for instance, hydroxyethylaminopropionic acid, dihydroxyethylaminopropionic acid, methylhydroxyethylaminopropionic acid, ethylhydroxyethylaminopropionic acid, hydroxyethylaminoacetic acid, dihydroxyethylaminoacetic acid, methylhydroxyethylaminoacetic acid, and the salts thereof. Examples of the aminocarboxylic acid having no OH group are, for instance, l-alanine, glycine, glutamic acid, α-alanine, serine and cysteine.

The present invention is more specifically described and explained by means of the following Examples in which all % are by weight unless otherwise noted. It is to be understood that the present invention is not limited to the Examples, and various changes and modifications may be made in the invention without departing from the spirit and scope thereof.

EXAMPLE 1 AND COMPARATIVE EXAMPLES 1 AND 2

A box-shaped stainless steel polymerization vessel (100 mm×100 mm×100 mm) equipped with a pipe for introducing nitrogen, a thermometer and a jacket for cooling water, the inner surface of which was coated with a synthetic resin film shown in Table 1 (film thickness: 50 μm), was charged with an aqueous solution of 100 g of acrylamide, 25 g of acrylic acid and 14 g of sodium hydroxide dissolved in 270 ml of distilled water. The dissolved oxygen was removed by blowing nitrogen gas into the aqueous solution. To the aqueous solution were then added 3 ml of a 5% aqueous solution of potassium persulfate and 3 ml of a 5% aqueous solution of sodium sulfite, and the polymerization was carried out for 3 hours, while passing water of 25° C. through the jacket. The influence of the synthetic resin film on the polymerization behavior and the stickiness of the produced polymer to the surface of the polymerization vessel were estimated according to the following criteria. The results are shown in Table 1.

State of polymerization

O: Polymerization proceeds uniformly over the length and breadth of the polymerization vessel.

X: A large amount of the unreacted monomer remains in the vicinity of the wall surface of the polymerization vessel.

Polymerization conversion

The center portion of the produced polymer mass was transversely cut in a thickness of about 3 cm and the cut piece was ground by a meat grinder. The conversion was measured by a $KBrO_3$ method.

Peelability

A: The produced polymer spontaneously peels off from the polymerization vessel by inverting the polymerization vessel or peels off by tapping the top of the inverted vessel.

B: The produced polymer is peeled off by a slight force, but does not spontaneously peels off even if the vessel is inverted.

C: The produced polymer is not peeled off by human power.

EXAMPLE 2 AND COMPARATIVE EXAMPLES 3 AND 4

The procedure of Example 1 was repeated except that 500 g of an 80% aqueous solution of N,N.N-trimethylaminoethyl methacrylate chloride was adjusted to pH 4 with a 10% aqueous solution of hydrochloric acid and the total amount was adjusted to 565 g with distilled water and it was subjected to the polymerization.

The results are shown in Table 1.

EXAMPLE 3 AND COMPARATIVE EXAMPLES 5 AND 6

The procedure of Example 1 was repeated except that an aqueous monomer solution prepared by dissolving 100 g of acrylamide, 25 g of acrylic acid and 15 g of methyl acrylate in 300 g of distilled water and adding 35 g of a 40% aqueous solution of sodium hydroxide to the monomer solution to adjust to pH 7.5 was subjected to the polymerization.

The results are shown in Table 1.

TABLE 1

| Synthetic resin film (film thickness: 50 μm) | State of polymerization | Conversion (%) | Peelability |
|---|---|---|---|
| Ex. 1 | TFE-ethylene copolymer (1:1 by weight) | O | 99.0 | A |
| Com. Ex. 1 | Polytetrafluoroethylene | X | 95.8 | A |
| Com. Ex. 2 | Polytrifluorochloroethylene | X | 95.6 | A |
| Ex. 2 | TFE-ethylene copolymer | O | 98.7 | A |
| Com. Ex. 3 | Polytetrafluoroethylene | X | 94.5 | A |
| Com. Ex. 4 | Polytrifluorochloroethylene | X | 94.7 | A |
| Ex. 3 | TFE-ethylene copolymer | O | 99.1 | A-B |
| Com. Ex. 5 | Polytetrafluoroethylene | X | 95.2 | A-B |
| Com. Ex. 6 | Polytrifluorochloroethylene | X | 95.1 | A-B |

EXAMPLE 4 AND COMPARATIVE EXAMPLES 7 AND 8

A stainless steel endless belt having a width of 450 mm and an effective length of 3.000 mm, the surface of which was covered with a TFE-ethylene copolymer (film thickness: 50 μm) and the back of which was capable of being sprayed with cold or hot water, was installed as a movable support in a chamber filled with nitrogen gas. The belt was moved at a constant rate of 30 mm/minute and water of 30° C. was sprayed to the back of the belt.

About 30 liters of a 75% aqueous solution of N,N,N-trimethylaminoethyl methacrylate adjusted to pH 4 with a 10% aqeuous solution of hydrochloric acid was thoroughly degassed with nitrogen gas, and was fed at a constant rate of 10 liters/hour from one end of the belt onto the moving belt.

On the other hand, each of a 5% aqueous solution of potassium persulfate and a 5% aqeuous solution of sodium sulfite was fed as a polymerization initiator at a rate of 70 ml/hour from 5 liter temporary storage tanks equipped with a stirrer and installed over the belt. The initiator solutions were admixed with the monomer solution and the mixture was continuously fed onto the belt.

In case of the above conditions, the time in which the monomer solution was subjected to the polymerization on the moving belt was 100 minutes, the thickness of the monomer solution layer on the moving belt was about 12 mm, and the total time required in the polymerization was 2 hours.

A polymer in the form of a sheet having a thickness of about 12 mm was obtained from another end of the endless belt 100 minutes after starting feed of the aqueous monomer solution. The produced polymer sheet was easily peeled off from the belt surface by human power and continuous polymerization for about 3 hours was possible.

For comparison, the above procedure was repeated except that an endless belt having no TFE-ethylene copolymer covering was employed (Comparative Example 7). The produced polymer sheet was not easily peeled off from the belt by human power. Peeling was attempted by using a machine, but the polymer sheet was broken. The continuous peeling could not be conducted and accordingly continuous polymerization was impossible.

Further, the above procedure was repeated except that a polytetrafluoroethylene film covering (thickness: 50 μm) was employed instead of the TFE-ethylene copolymer film covering (Comparative Example 8). The produced polymer sheet was easily peeled off by human power, but a large amount of the unreacted monomer remained in the interface between the produced polymer sheet and the polytetrafluoroethylene covering film and no industrial value was found from the viewpoint of continuous polymerization.

EXAMPLES 5 TO 7 AND COMPARATIVE EXAMPLES 9 TO 11

An aluminum vapor deposited TFE-ethylene copolymer film (thickness: 50 μm) was stuck with an adhesive to the inner surface of a box-shaped stainless steel polymerization vessel (100 mm×100 mm×100 mm) equipped with a nitrogen introducing pipe, a thermometer and a cooling jacket and made of a material shown in Table 2 so that the aluminum surface contacted the vessel surface. The vessel was placed in a chamber filled with nitrogen gas. An aqueous solution of 100 g of acrylamide, 25 g of acrylic acid and 14 g of sodium hydroxide dissolved in 270 ml of distilled water was charged in the polymerization vessel, and nitrogen gas was blown into the aqueous monomer solution through the nitrogen introducing pipe to remove the dissolved oxygen.

To the aqueous monomer solution was added 1.5 ml of a 1% solution of benzoin methyl ether dissolved in acrylic acid, and they were uniformly admixed. The polymerization was carried out for 30 minutes by irradiating ultraviolet rays with intensity of 50 W/m$^2$ (measured by a ultraviolet illuminometer) to the monomer solution from a ultraviolet irradiation apparatus arranged over the polymerization vessel in the chamber, while passing water of 20° C. through the cooling jacket.

The results are shown in Table 2.

EXAMPLES 8 TO 10 AND COMPARATIVE EXAMPLES 12 to 14

The procedures of Examples 5 to 7 were repeated except that 500 g of a 75% aqueous solution of N,N,N-trimethylaminoethyl methacrylate adjusted to pH 4 with a 10% hydrochloric acid was employed as a monomer solution and 1.2 ml of a 5% methanol solution of benzoin isopropyl ether was employed instead of 1.5 ml of a 1% acrylic acid solution of benzoin methyl ether.

For comparison, the polymerization was carried out in the same manner as above except that a polymerization vessel having no aluminum deposited resin film was employed.

The results are shown in Table 2.

TABLE 2

| | Material of polymerization vessel | State of polymerization | Conversion (%) | Peelability |
|---|---|---|---|---|
| Ex. 5 | SS*/Al-deposited resin film | ◯ | 99.5 | A |
| Ex. 6 | SBR (black)/Al-deposited resin film | ◯ | 99.3 | A |
| Ex. 7 | Mirror finished stainless steel/Al-deposited resin film | ◯ | 99.5 | A |
| Com. Ex. 9 | SS | X | 92.0 | C |
| Com. Ex. 10 | SBR (black) | X | 88.4 | C |
| Com. Ex. 11 | Mirror finished stainless steel | ◯ | 99.3 | B-C |
| Ex. 8 | SS/Al-deposited resin film | ◯ | 98.9 | A |
| Ex. 9 | SBR (black)/Al-deposited resin film | ◯ | 99.0 | A |
| Ex. 10 | Mirror finished stainless steel/Al-deposited resin film | ◯ | 99.1 | A |
| Com. Ex. 12 | SS | X | 92.8 | C |
| Com. Ex. 13 | SBR (black) | X | 87.7 | C |
| Com. Ex. 14 | Mirror finished stainless steel | ◯ | 98.8 | C |

*SS: Rolled steel for general structure

EXAMPLES 11 AND 12 COMPARATIVE EXAMPLES 15 TO 18

A TFE-ethylene copolymer film having a vaccum deposited aluminum layer on the back was stuck to an endless belt having a width of 450 mm and an effective length of 3,000 mm which was made of a material shown in Table 3 and the back of which was capable of being sprayed with hot or cold water from the lower part. The thus covered belt was installed as a movable support in a chamber filled with nitrogen gas, and was moved at a constant rate of 100 mm/minute, while spraying water of 20° C. to the back of the belt. Also, a low pressure mercury lamp was arranged as a ultraviolet irradiation source over the belt. The intensity of ultraviolet rays was 50 W/m$^2$.

About 40 liters of a 75% aqueous solution of N,N,N-trimethylaminoethyl methacrylate adjusted to pH 4 with a 10% hydrochloric acid was thoroughly degassed with nitrogen gas, and was fed at a constant rate of 13.5 liters/hour onto one end of the moving belt.

On the other hand, a 5% methanol solution of benzoin isopropyl ether was fed as a polymerization initiator at a rate of 30 ml/hour from a 5 liter temporary storage tank equipped with a stirrer and arranged over the belt. The initiator solution and the monomer solution were uniformly admixed and fed onto the belt to conduct the photopolymerization by ultraviolet irradiation.

In case of the above conditions, the time in which the monomer solution was irradiated with ultraviolet rays on the moving belt was 30 minutes, and the thickness of the layer of the fed monomer solution was about 5 mm.

A sheet of the produced polymer having a thickness of 5 mm was obtained from another end of the belt 30 minutes after starting the feed of the monomer solution. The produced polymer sheet was easily peeled off from the belt surface by human power and the continuous polymerization for about 3 hours was possible.

For comparison, the above procedure was repeated except that an endless belt made of the material shown in Table 3 having no covering or having a covering shown in Table 3 was employed. The produced polymer sheet was not easily peeled off from the belt. The peeling was attempted by using a machine, but the polymer sheet was broken. The continuous peeling could not be conducted and accordingly the continuous polymerization was impossible.

The results are shown in Table 3.

TABLE 3

| | Material of endless belt | Results of polymerization |
|---|---|---|
| Ex. 11 | Mirror finished stainless steel/Al-deposited TFE-ethylene copolymer film | Uniform polymerization and easy peeling, conversion 99.4% |
| Ex. 12 | SBR (black)/Al-deposited TFE-ethylene | Uniform polymerization and easy |

TABLE 3-continued

| | Material of endless belt | Results of polymerization |
|---|---|---|
| | copolymer film | peeling, conversion 99.2% |
| Com. Ex. 15 | Mirror finished stainless steel | Uniform polymerization but hard peeling, remaining of slight unreacted monomer in belt contacting part |
| Com. Ex. 16 | SBR (black) | Nonuniform polymerization, remaining of a large amount of unreacted monomer in belt contacting part |
| Com. Ex. 17 | Polytetrafluoroethylene coated steel | Nonuniform polymerization, remaining of a large amount of unreacted monomer in belt contacting part |
| Com. Ex. 18 | SBR/polyethylene film | Nonuniform polymerization, remaining of a large amount of unreacted monomer in belt contacting part |

EXAMPLE 13

In 500 g of demineralized water was dissolved 400 g of acrylamide, and 20 g of a 1% aqueous solution of potassium persulfate. 5 g of 1% aqueous solution of sodium hydrogensulfite and 1 g of sodium dioctyl sulfosuccinate were dissolved in the obtained aqueous monomer solution. The total amount of the aqueous solution was then adjusted to 1,000 g with demineralized water. The aqueous solution was placed in a degassing vessel, and nitrogen gas was passed through the solution to remove the dissolved oxygen.

The polymerization was carried out in a box-shaped stainless steel polymerization vessel having a size of 100 mm in length, 100 mm in width and 150 mm in height at an atmospheric temperature of 30° C. for 3 hours.

The obtained polymer was hard and in the form of a high elastic gel. The mass of the polymer gel was ground to particles having a particle size of about 3 mm by an electric meat grinder. It was done without burden and heat generation. Even if the particles were pressed hard by hand, they did not adhere to each other.

The coarse particles were then finely divided by a meat grinder having a screen of 2 mm in opening diameter. The state of the particles did not change.

Further, 500 g of the particles having a particle size of about 3 mm were placed in a 5 liter fluidized bed dryer (diameter 100 mm and height 150 mm) in the form of a layer of about 25 mm in thickness, and dried by passing hot air of 80° C. The solid content of the particles reached 90% 20 minutes after starting the drying, and no agglomeration of the particles was observed during the drying.

COMPARATIVE EXAMPLES 19 TO 21

The procedures of Example 13 were repeated except that sodium dioctyl sulfosuccinate was not employed (Comparative Example 19), polyoxyethylene glycol ether having a molecular weight of 1,000 was employed instead of sodium dioctyl sulfosuccinate (Comparative Example 20), or sodium dioctyl sulfosuccinate was not employed in the polymerization and the surface of the polymer gel was coated with polyoxyethylene glycol ether having a molecular weight of 1,000 in an amount of 0.25% based on the polymer gel before grinding to coarse particles of 3 mm in particle size, (Comparative Example 21). The states of coarse grinding, coarse particles and drying were observed.

The results are shown in Table 4.

TABLE 4

| | State of grinding and particles | State of drying |
|---|---|---|
| Com. Ex. 19 | The polymer gel generated heat upon grinding due to a relatively large burden. The coarse particles strongly adhered to each other and assumed a noodle-like form. Thus, it was very difficult to further finely divide the coarse particles. | Agglomeration was marked, and after drying for 20 minutes, only the particle surface was dried, but the inner portion of the particles was still soft. |
| Com. Ex. 20 | Burden in coarse grinding was small, but adhesion of particles to each other was observed. At the time of finely dividing the coarse particles, a part of the particles assumed a noodle-like form. | After 20 minutes, the inside of coarse particles was somewhat sticky, and agglomeration was observed. After about 45 minutes, the inside showed a dried state as well as the particle surface. |
| Com. Ex. 21 | Burden was observed in grinding, and the coarse particles remarkably adhered to each other in part. At the time of finely dividing the coarse particles, the particles assumed a noodle-like form. | After 20 minutes, sticky particles were still much, and the agglomeration was marked. After 65 minutes, the particles showed a nearly completely dried state. |

A part of the undried fine particles was allowed to stand in the form of a layer of about 2 cm in thickness under a load of 1 kg/cm$^2$ at room temperature for one month. The particles weakly adhered to each other, but were easily returned to the original fine particle state by lightly crumpling. Accordingly, it is possible to put the particles on the market without drying.

EXAMPLE 14

The procedures of Example 13 were repeated except that 320 g of acrylamide and 80 g of sodium acrylate were employed instead of 400 g of acrylamide. The states of coarse grinding, particles and drying were observed.

The grinding of the polymer gel into coarse particles by a meat grinder was done without any burden, and the obtained particles were crisp.

Upon finely dividing the coarse particles by a meat grinder having a screen of 2 mm in opening diameter, a little burden was observed, but no heat generation was observed.

After drying the coarse particles of about 3 mm in particle size for 20 minutes, the particles was slightly soft as a whole, but no adhesion of the particles to each other was observed and also no non-uniform drying of the inside of the particles was observed. The particles were almost dried up for 25 minutes.

EXAMPLE 15

The procedures of Example 13 were repeated except that 250 g of acrylamide was employed instead of 400 g of acrylamide. The obtained polymer was in the form of a slightly soft gel.

The polymer gel could be easily ground to coarse particles having a particle size of about 3 mm by an electric meat grinder without heat generation and adhesion of particles to each other.

The coarse particles were then dryed with hot air of 85° C. After about 30 minutes, the solid content of the particles reached 90%, and the adhesion of the particles was merely observed in a very small portion.

COMPARATIVE EXAMPLE 22

The procedures of Example 14 were repeated except that sodium dioctyl sulfosuccinate was not employed.

The burden in grinding by the meat grinder was large, and heat generation was marked. Also, the obtained coarse particles were adhered to each other in a noodle-like form.

The particles were dried for 100 minutes with a hot air of 80° C., but the inside of the particles was still soft and the drying was insufficient.

EXAMPLE 16

The procedures of Example 13 were repeated except that acrylamide was employed in an amount of 250 g, and 2.5 g of nonylphenyl-ethylene oxide adduct (HLB 12) was additionaly employed as a non-ionic surfactant.

The obtained polymer was in the form of a slightly soft gel, but it could be easily ground to particles having a particle size of about 3 mm by a meat grinder without heat generation and adhesion. The coarse particles were allowed to stand in the form of a layer of about 2 cm in thickness under a load of 1 kg/cm$^2$ at room temperature for one month. No change was observed.

The coarse particles were dryed with a hot air of 80° C. After about 25 minutes, the solid content of the particles reached 90% or higher, and no adhesion of the particles to each other was observed.

EXAMPLE 17

The procedures of Example 13 were repeated except that 320 g of acrylamide and 80 g of sodium acrylate were employed instead of 400 g of acrylamide, and 1 g of sodium butyl-2-ethylhexyl sulfosuccinate was employed instead of 1 g of sodium dioctyl sulfosuccinate.

The obtained polymer gel could be ground to coarse particles having a particle size of about 3 mm by a meat grinder without any burden, and the obtained particles had no stickiness.

The coarse particles were then pulverized by a meat grinder having a screen of 2 mm in opening diameter. A slight burden was observed, but heat generation was not observed.

The coarse particles were dried for 20 minutes. The dried particles were slightly soft as a whole, but did not adhere to each other. Also, the inside of the particles was uniformly dried. The particles were almost completely dried by further drying for 25 minutes.

In addition to the ingredients used in the Examples, other ingredients can be used in the Examples as set forth in the specification to obtain substantially the same results.

What we claim is:

1. In a process for preparing a sticky water-soluble polymer by polymerizing an aqueous solution containing at least one monomer having a polymerizable double bond to produce said sticky water-soluble polymer, the improvement which comprises carrying out the polymerization in a polymerization apparatus the portion of which contacts the monomer solution having a surface layer made of a tetrafluoroethylene-ethylene copolymer; said at least one monomer being selected from the group consisting of acrylamide, methacrylamide, an acrylic acid salt, a methacrylic acid salt, a nitrogen-containing acrylic acid ester, a diallylamine compound, a sulfoalkyl acrylate, a sulfoalkyl methacrylate, a water-insoluble acrylic acid ester, a water-insoluble methacrylic acid ester, an acrylamide alkylsulfonate, a dialkyl acrylamide, a dialkyl methacrylamide, acrylonitrile, a vinylsulfonic acid, and a vinylsulfonic acid salt and said tetrafluoroethylene-ethylene copolymer being a polymer forming a film having such an oxygen impermeability that hindrance to the polymerization of the at least one monomer on the surface layer is eliminated.

2. The process of claim 1, wherein a metal deposition layer is provided between a surface of the apparatus and the copolymer layer which is in contact with the monomer solution.

3. The process of claim 1, wherein the monomer solution contacting portion of the apparatus having the copolymer surface layer is a movable support covered with a metal deposited tetrafluoroethylene-ethylene copolymer film, the metal deposition layer being in contact with the support surface, and the polymerization is carried out by continuously feeding the aqueous monomer solution containing a photopolymerization initiator in the form of a thin layer onto the moving support, while irradiating ultraviolet rays to the thin layer of the aqueous monomer solution, and continuously peeling off a layer of the produced polymer from the moving support.

4. The process of claim 1, wherein the aqueous monomer solution is a 20 to 60% by weight aqueous solution of acrylamide or a mixture of acrylamide and a minor amount of other vinyl monomers copolymerizable with acrylamide.

5. The process of claim 1, wherein the aqueous monomer solution is a 50 to 80% by weight aqueous solution of a quaternary salt or a salt with an acid of a dialkylaminoalkyl acrylate or methacrylate or a mixture thereof with other copolymerizable vinyl monomers.

6. The process of claim 1, wherein the aqueous monomer solution contains a photopolymerization initiator, an aliphatic tertiary amine and at least one surfactant selected from the group consisting of an anionic surfactant having —SO$_3$⁻ group and a non-ionic surfactant.

7. The process of claim 6, wherein the anionic surfactant having —SO$_3$⁻ group is a dialkyl sulfosuccinate.

8. The process of claim 1, wherein the aqueous monomer solution contains a water-soluble cellulose derivative.

9. The process of claim 1, wherein the aqueous monomer solution contains a hypophosphite or a mixture of a hypophosphite and a tertiary amine.

10. The process of claim 1, wherein the aqueous monomer solution contains an aliphatic tertiary amine and a dialkyl sulfosuccinate.

11. The process of claim 1, wherein the polymerization is carried out by subjecting an aqueous solution containing a photopolymerization initiator and a monomer selected from the group consisting of acrylamide and acrylic acid to irradiation of ultraviolet rays, and to the produced polymer is added an aminocarboxylic acid having hydroxyl group or a mixture of the aminocarboxylic acid having hydroxyl group and an aminocarboxylic acid having no hydroxyl group or a urea compound.

12. The process of claim 1, wherein the polymerization is carried out by subjecting an aqueous monomer solution containing a photopolymerization initiator and in the form of a layer having a thickness of 3 to 10 mm on a moving support to irradiation of ultraviolet rays having a wavelength of 300 to 450 millimicrons with an intensity on the support surface of 0 to 50 W/m$^2$.

13. The process of claim 1, wherein the concentration of dissolved oxygen in the aqueous monomer solution is at most 0.5 p.p.m. and the polymerization is carried out in an atmosphere containing at most 0.5% by volume of oxygen.

14. The process of claim 1, wherein the tetrafluoroethylene-ethylene copolymer is a copolymer containing tetrafluoroethylene and ethylene in a ratio of about 1:1 by weight.

15. The process of claim 1, wherein the tetrafluoroethylene-ethylene copolymer is a copolymer containing tetrafluoroethylene and ethylene in a ratio of about 5:5 to 6:4 by weight.

* * * * *